United States Patent
Lee et al.

(10) Patent No.: US 9,887,433 B2
(45) Date of Patent: Feb. 6, 2018

(54) COPOLYMER ELECTROLYTES FOR SECONDARY BATTERY, METHOD FOR PREPARING THE SAME AND USE THEREOF

(71) Applicant: SEOUL NATIONAL UNIVERSITY R&DB FOUNDATION, Seoul (KR)

(72) Inventors: Jong-Chan Lee, Seoul (KR); Ji-Hoon Baik, Seoul (KR); Dong-Gyun Kim, Gyeonggi-do (KR); Jimin Shim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 276 days.

(21) Appl. No.: 14/329,181

(22) Filed: Jul. 11, 2014

(65) Prior Publication Data

US 2015/0288027 A1    Oct. 8, 2015

(30) Foreign Application Priority Data

Apr. 8, 2014 (KR) .................. 10-2014-0042057

(51) Int. Cl.
*H01M 10/0565* (2010.01)
*C08F 220/28* (2006.01)
*H01M 10/052* (2010.01)

(52) U.S. Cl.
CPC ....... *H01M 10/0565* (2013.01); *C08F 220/28* (2013.01); *H01M 10/052* (2013.01); *H01M 2220/30* (2013.01); *H01M 2300/0082* (2013.01)

(58) Field of Classification Search
CPC ............................................. H01M 10/0565
See application file for complete search history.

(56) References Cited

U.S. PATENT DOCUMENTS

| 4,371,689 A | 2/1983 | Gaku et al. |
| 5,240,791 A | 8/1993 | Izuti et al. |
| 2003/0124431 A1* | 7/2003 | Hwang ............... C08F 220/22 429/316 |

FOREIGN PATENT DOCUMENTS

| KR | 10-1351846 B1 | 1/2014 |
| KR | 10-1368870 B1 | 2/2014 |

OTHER PUBLICATIONS

Dong-Gyun Kim et al., "Photo-cross-linkable star-shaped polymers with poly (ethyl glycol) and renewable cardanol side groups: synthesis, characterization, and application to antifouling coatings for filtration membranes", Polym. Chem. vol. 4, Jul. 10, 2013, pp. 5065-5073.

Kulasekarapandian K. et al., "Preparation and Characterization of PVC-PEO Based Polymer Blend Electrolytes Complexed With Lithium Perchlorate", International Journal of Engineering research and Development vol. 5 Issue 11, Feb. 2013, pp. 30-39.

John J. La Scala et al., "Fatty Acid-Based Monomers as Styrene Replacements for Liquid Molding Resins", Polymer vol. 45, May 2005, pp. 7729-7737.

(Continued)

*Primary Examiner* — Stephan Essex
(74) *Attorney, Agent, or Firm* — Ladas & Parry LLP (57) ABSTRACT

The present invention provides copolymers of polyethylene oxide methacrylate and alkenyl group-containing methacrylate, method for preparing the same and use thereof. The copolymers may be used for preparing solid phase electrolytes having high ionic conductivity and enhanced physical properties.

15 Claims, 2 Drawing Sheets

(56) References Cited

OTHER PUBLICATIONS

Binoy Maiti et al., "RAFT polymerization of fatty acid containing monomers: controlled synthesis of polymers from renewable resources", RCS Adv., vol. 3, Oct. 11, 2013, pp. 24983-24990.
Poonam Sharma et al., "Effect of Nano-Filler on Structural Ionic Transport Properties of Plasticized Electrolyte" Open Journal of Organic Polymer Materians vol. 2, Published online Apr. 2012, pp. 38-44.

* cited by examiner

COPOLYMER ELECTROLYTES FOR SECONDARY BATTERY, METHOD FOR PREPARING THE SAME AND USE THEREOF

The present application claims priority benefits from South Korean Patent Application No. KR 10-2014-0042057 filed on Apr. 8, 2014, the contents of which is incorporated by reference in their entirety.

FIELD OF THE DISCLOSURE

The present disclosure relates generally to polymer electrolytes, methods for preparing the same and uses thereof, and more particularly to polymer electrolytes for secondary batteries, methods for preparing the same and uses thereof.

BACKGROUND OF THE DISCLOSURE

Lithium secondary batteries having high energy density which are used for various applications such as cellular phones, digital cameras, laptop computers, mobile digital media players and MP3 players use liquid electrolytes generally. Therefore they have explosion risk and thus complicated layouts for preventing explosion of batteries are needed.

Since solid electrolytes including polymers can solve the above-mentioned problem and make it possible to develop small scale and thin layer type batteries, studies on this field have been carried out actively. However, there are some problems for commercializing the solid electrolytes, since they have significantly lower ionic conductivity than liquid electrolytes. Therefore, the development of a material for electrolytes sustaining solid phase and having higher ionic conductivity is urgently required.

The polymer material has been used for a long period of time as solid phase electrolytes is polyethylene oxide (PEO) such as polyethylene glycol and it has ionic conductivity like liquids, although it is a solid phase material. Alkali metal salts in the polymer may exist as stable ions since cations dissociated from the salts form a coordination complex through coordinate bonds with oxygen atoms in the polymer and thus can be stabilized thereby. These ions can move through the polymer as dissociated state and thus show ionic conductivity. However, linear polyethylene oxide has somewhat broad crystallizing area and low ionic conductivity of $10^{-8}$ S/cm at room temperature thereby. The characteristic acts as a bottleneck for commercializing PEO as solid electrolytes.

Thus, over the past 20 years, various studies to enhance ionic conductivity of PEO by lowering crystallinity thereof have been made. For representative examples, a method of blending with a non-crystallized polymer (Kulasekarapandian et al., *Int. J. Eng. Res. Dev.*, 5(11): 30-39, 2013), a method of enhancing flexibility of polymer chain by adding a plasticizer (Korean Patent No. 1368870), a method of adding side chains of low molecular weight ethylene oxide to main polymer chains (Korean Patent No. 1351846), a method of fixing low molecular weight polyethylene oxide to polymer having crosslinked network structure (U.S. Pat. No. 5,240,791), and a method of blending the PEO with inorganic nano-filler (Sharma et al., *Open Journal of Organic Polymer Materials*, 2: 38-44, 2012) were reported.

SUMMARY OF THE DISCLOSURE

However, the above-described polyethylene oxide-based polymer electrolytes for lithium secondary batteries have some disadvantages. For examples, ionic conductivity of the polymer gets lower because the liquidity of the polymer chains is lowered when one elevates mechanical strength of the polymer. On the contrary mechanical strength and physical properties are lowered and stable membrane between anode and cathode is not generated thereby, when one elevates the liquidity of the polymer in order to enhance ionic conductivity of the polymer.

The present disclosure is devised to solve various problems including the problems described above. Thus the object of the present disclosure is to provide polymer electrolytes having high ionic conductivity, good stability and mechanical strength at the same time, methods for preparing the same, and uses thereof such as application in the production of secondary batteries In an aspect to the present disclosure, a polymer having the following structure is provided:

wherein, the n and m are integers of 1 or more, independently, x is an integer between 6 to 10, L is absent or a linker which is a bond or a divalent radical, A is a moiety comprising alkenyl group having 12 to 22 carbon atoms, wherein the alkenyl group has 1 to 6 double bonds.

In another aspect to the present disclosure, a method for preparing the polymer is provided, the method comprises:

preparing PEGMA (polyethylene glycol methacrylate) monomers and methacrylic acid monomers substituted with moiety comprising alkenyl group having 12 to 22 carbon atoms, wherein the alkenyl group has 1 to 6 double bond (ACMA); and copolymerizing the monomers by mixing the PEGMA monomers and the ACMA monomers in organic solvent and adding an initiator to the mixture.

In another aspect to the present disclosure, a solid phase electrolyte composition comprising a crosslinked polymer prepared by cross-linking the polymer with a photo-crosslinker and an alkali metal salt dispersed in the polymer is provided.

In another aspect to the present disclosure, a method for preparing the solid phase electrolyte composition is provided, the method comprises:

mixing the polymer, an alkali metal salt and a photo-crosslinker; and inducing photo-crosslinking between the polymers by irradiating light to the mixture.

In another aspect to the present disclosure, a secondary battery comprising the solid phase electrolyte is provided.

DETAILED DESCRIPTION OF THE PRESENT DISCLOSURE

Definition of Terms

Terms used in this document will be defined as follows:
The term "PEGMA" used in this document is referred to as a methacrylic acid derivative substituted with polyethylene glycol. Methacrylic acid derivatives may form polymethacrylate (PMA) polymer by polymerization under appropriated conditions.

The term "ACMA" or "alkenyl-containing methacrylic acid" used in this document is referred to as a substituted methacrylic acid substituted with a moiety comprising an aliphatic hydrocarbon having at least one double bond, i.e., alkenyl group and comprises alkenyl methacrylic acid, cardanol methacrylic acid such as HCPM (2-hydroxy-3-cardanylpropyl methacrylate) and unsaturated fatty acid-substituted methacrylic acid.

The term "cardanol" used in this document is referred to as natural plant oil extracted from pericarp of cashew nut tree belonging ancardiaceae. The cardanol is a heterogeneous composition consisting of phenol derivatives whose carbon No. 3 is substituted with pentadecyl group (~5%), 8-pentadecyl group (~35%), 8,11-pentadecadienyl group (~25%) and 8, 11, 14-pentadecatrienyl group (~45%).

The term "moiety" used in this document is referred to as a part of a functional group of a molecule or the whole functional group.

Detailed Description of the Exemplary Embodiments

The exemplary embodiments of the present disclosure are described in detail as follows:

In an aspect to the present disclosure, a polymer having the following structure is provided:

wherein, the n and m are integers of 1 or more, independently, x is an integer between 6 to 10, L is absent or a linker which is a bond or a divalent radical, A is a moiety comprising alkenyl group having 12 to 22 carbon atoms, wherein the alkenyl group has 1 to 6 double bonds.

According to the above polymer, the bond comprises any chemically stable covalent bonds, the bond may be amide bond (—NHCO—), ester bond (—COO—) thioester bond (—COS—), ether bond (—O—), thioether bond (—S—) or disulfide bond (—S—S—). The divalent radical may be an aliphatic radical having carbon numbers between 2 to 10, or an aromatic radical, and the aliphatic radical may be alkylene or alkylene oxide, the alkylene may be 2-hydroxypropylene.

According to the above polymer, the ratio of the n and m may be 17:1 to 1:1.

According to the above polymer, the A may be cardanol, alkenyl group or unsaturated fatty acids. However, the A may contains small amount of alkyl groups or saturated fatty acids.

The cardanol may have the following structure:

wherein the R is as follows:

(40~45%)

(20~25%)

(30~35%)

(1~5%)

According to the above polymer, the alkenyl group may be monounsaturated aliphatic hydrocarbon or polyunsaturated aliphatic hydrocarbon, optionally the monounsaturated aliphatic hydrocarbon and the polyunsaturated aliphatic hydrocarbon may be used in combination. The monounsaturated aliphatic hydrocarbon may be dodecene, tridecene, tetradecene, pentadecene, hexadecene, heptadecene, octadecene, nonadecene, eicosene or dococene and the position of double bond in the monounsaturated aliphatic hydrocarbon may be any position between carbon numbers of 1 to 21. The polyunsaturated aliphatic hydrocarbon may be dodacedien, tridecadiene, tetradecadien, pentadecadien, hexadecadien, heptadecadien, octadecadien, nonadecadien, eicosadien, docosadien, dodecatriene, tridecatriene, tetradecatriene, pentadecatriene, hexadecatriene, heptadecatriene, octadecatriene, nonadecatriene, eicosatriene, docosatriene, eicosatetraene, eicosapentaene, eicosahexaene, docosatetraene, docosapentaene or docosahexanene, and optionally at least two alkenyl groups among the above may be used in combination. The unsaturated fatty acid may be 5-dodecenoic acid (12:1(n-7)), 7-tetradecenonic acid (14:1(n-7)), palmitoleic acid (16:1(n-7)), vaccenic acid (18:1(n-7)), paullinic acid (20:1(n-7)), oleic acid (18:1(n-9)), elaidic acid (18:1(n-9)), eicosenoic acid (20:1(n-9)), erucic acid (22:1 (n-9)), nervonic acid (24:1(n-9)), linoleic acid (18:2(n-6)), gamma-linolenic acid (18:3(n-6)), dihomo gamma-linolenic acid (18:3(n-6)), arachidonic acid (20:4(n-6)), alpha-linolenic acid (18:3(n-3)), eicosapentaenic acid, EPA (20:5(n-3)), or docosahexaenic acid, DHA (22:6(n-3)) and optionally at least two fatty acid among above may be used in combination.

Number-average molecular weight (Mn) of the polymer may be 2,000 to 100,000, or 3,000 to 70,000, or 4,000 to 50,000, or 5,000 to 25,000.

In another aspect to the present disclosure, a method for preparing the polymer is provided, the method comprises:

preparing PEGMA (polyethylene glycol methacrylate) monomers and methacrylic acid monomers substituted with moiety comprising alkenyl group having 12 to 22 carbon atoms, wherein the alkenyl group has 1 to 6 double bond (ACMA); and copolymerizing the monomers by mixing the PEGMA monomers and the ACMA monomers in organic solvent and adding an initiator to the mixture.

According to the method, molar ratio of the PEGMA monomers and ACMA monomers may be 17:1 to 1:1, or 16:1 to 3:2, or 15:1 to 3:1, or 14:1 to 4:1, or 13:1 to 5:1, or 12:1 to 6:1, or 12:1 to 10:1.

According to the method, the organic solvent may be water, tetrahydrofuran (THF), methanol, ethanol, isopropanol, dimethyl formamide (DMF), dimethylsulfoxide (DMSO), propylene glycol methyl ether acetate (PGMEA), n-butyl acetate (NBA), ethyl acetate (EtAc), n-hexane, cyclohexane, benzene, toluene, benzonitrile or anisole, or optionally at least two solvents among the above solvents may be used in combination or a polar solvent and a nonpolar solvent may be used as a two phase system.

According to the method, the initiator may be azobisisobutyronitrile (AIBN), azobisdimethylvaleronitrile (ADMVN), dilauroyl peroxide (DLP), benzoyl peroxide (BPO), acetyl peroxide, t-butyl peracetate, cumyl peroxide, t-butyl peroxide, t-butyl hydroperoxide, or bis(4-tert-butylcyclohexyl) peroxydicarbonate, or may be a combination thereof. Optionally, if the initiator is water, a redox initiator may be used as an initiator. In this case, a radical of the methacrylic acid monomers may generated by mixing the monomers with a redox initiator such as Fe(II) ion, hydrogen peroxide, and other peroxide compound and inducing a redox reaction.

In another aspect to the present disclosure, a solid phase electrolyte composition comprising a crosslinked polymer prepared by crosslinking the polymer with a photo-crosslinker, and an alkali metal salt dispersed in the polymer is provided.

According to the solid phase electrolyte composition, the photo-crosslinker may be 2-hydroxy-2-methylpropiophenone (HMPP), camphorquinone, acroyl chloride, trimethylopropane triacrylate (TPT), polyethylene glycol diacrylate (PEGDA), AIBN, BPO or 2,2-dimethoxy-2-phenylacetophenone (DMPA), or may be a combination thereof.

According to the solid phase electrolyte composition, the alkali metal salt may be a lithium salt, sodium salt or potassium salt or the combination thereof, and the lithium salt may be lithium bis(tetrafluoromethanesulfonyl)imide (LiTFSI), lithium hexafluorophosphate (LiPF$_6$), lithium perchlorate (LiClO$_4$), lithium triflate (LiTf), lithium bis(oxalato)borate (LiBOB), lithium tetrafluoroborate (LiBF$_4$), lithium oxalyldifluoroborate (LiODFB), or lithium fluoroalkylphosphate (LiFAP), or may be a combination thereof. The sodium salt may be sodium tetrafluoroborate (NaBF$_4$), sodium hexafluorophosphate (NaPF$_6$), sodium perchlorate (LiClO$_4$), 4,5-dicyano-2(trifluormethyl)imidazolate (NaTDI), or sodium 4,5-dicyano-2-(pentafluoroethyl)imidazolate (NaPDI), or optionally may be a combination thereof. The potassium salt may be potassium tetrafluoroborate (KBF$_4$), potassium perchlorate (KClO$_4$), or potassium hexafluorophosphate (KPF$_6$), or optionally may be a combination thereof.

In another aspect to the present disclosure, a method for preparing the solid phase electrolyte composition is provided, the method comprises:

mixing the polymer, an alkali metal salt and a photocrosslinker; and inducing photo-cross-linking between the polymers by irradiating light to the mixture.

According to the method, the alkali metal salt and the photo-crosslinker are as described above.

According to the method, the light may be UV light or visible light, and the UV light may have 200 to 400 nm of wavelength.

In another aspect to the present disclosure, a secondary battery comprising the solid phase electrolyte is provided.

The present inventors synthesized a copolymer of polyethylene glycol methacrylate and methacrylate containing an alkenyl group using a free radical polymerization (FRP) method capable of producing solid electrolytes easily, as a One-pot & One-step protocol. The synthesized copolymer was designated as "PHP, poly(HCPM-co-PEGMA)" and the number accompanied by the "PHP" was determined as molar ratio of the methacrylate containing an alkenyl group. (i.e., PHP8 means a polymer containing 8 molar percent of methacrylate monomer having an alkenyl group).

The present inventors obtained a solid phase electrolyte by mixing the copolymer synthesized as described above, an alkali metal salt and a photo-crosslinker and irradiating UV light to the mixture.

Figure 2:
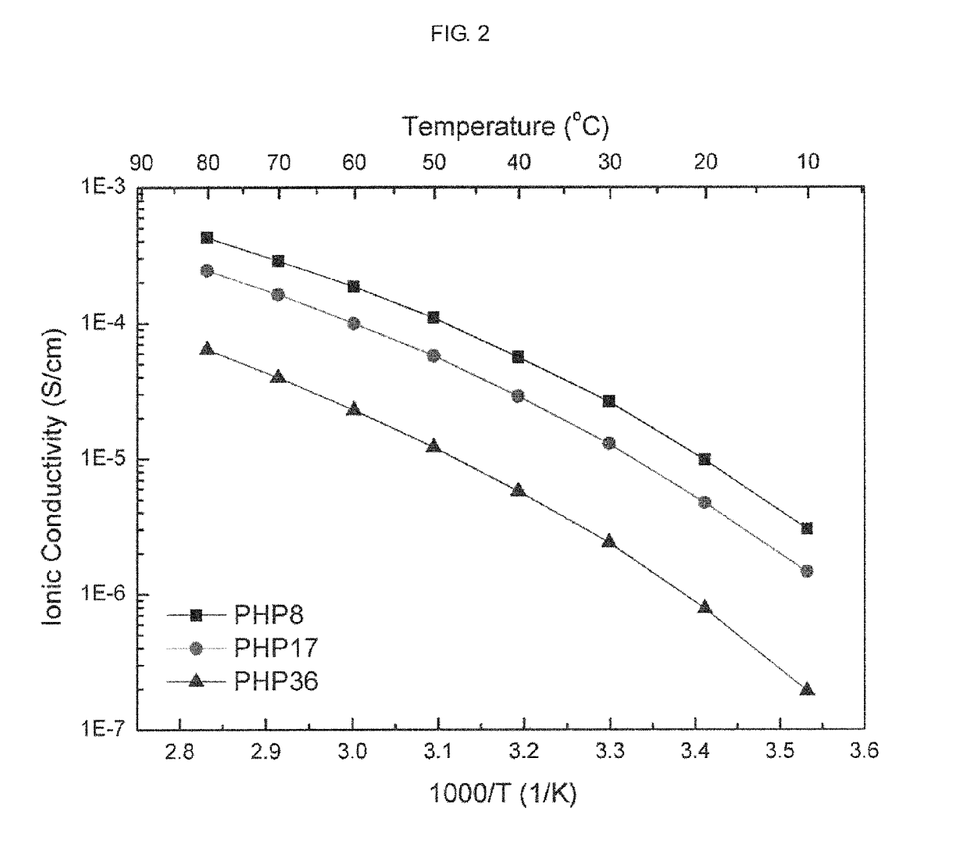
FIG. 2 is a graph showing ionic conductivity of the solid phase electrolyte according to an embodiment of the present disclosure.

In this case, the present inventors designed solid phase electrolytes considering the following points. First of all, the present inventors used a polymer with comb structure to which PEGs are attached as side chains rather than being extended longitudinally by using PEGMA in order to incorporate short length PEG chains to the polymer. The structure forms ion transport pathway in the polymer and lowers crystallinity of polyethylene oxide due to short length of side chain and thus increases the ratio of amorphous phase thereby. Secondly, it is needed to increase the mechanical strength and the physical properties in order to obtain the final solid film after obtaining a solid phase electrolyte form the solid polymer. To this end, the present inventors prepared methacrylate containing an alkenyl group (e.g., cardanol-substituted methacrylate) capable of being photo-crosslinked. A cardanol used in an embodiment of the present disclosure which is a material present in pericarp of cashew nut tree is a heterogeneous composition consisting of compounds containing a phenol substituted with a C15 aliphatic hydrocarbon. Most of the C15 aliphatic hydrocarbons (up to 99%) are unsaturated. This unsaturated hydrocarbons may be polymerized by crosslinking with radicals generated from photo-crosslinkers. In addition, since it has relative longer chain than previous crosslinkers, it does not only enhance the mechanical strength after crosslinking, but also helps segmentation movement of the polymer by extending the distance between polymer chains due to long distance between crosslinked points. Therefore, effects of lowering fluidity of the polymer due to crosslinking is somewhat offset, while maintaining the mechanical strength of the polymer it is possible to maintain the fluidity of the polymer capable of transporting alkali metal ions through the polymer. Actually, the present inventors obtained results satisfying both characteristics the mechanical strength and the high ionic conductivity, by preparing a solid phase electrolyte using a copolymer synthesized with appropriate molar ratio of PEGMA and HCPM, and lithium salts (See FIG. 2).

Hereinafter, the present disclosure will be described in detail with reference to following examples. However, the present disclosure is not limited to the following examples and the present disclosure may be embodied in many different embodiments. Thus, the following examples are provided in order to fully disclose the present disclosure and fully inform the scope of the disclosure to a person skilled in the art.

EXAMPLE 1

Preparation of Reagents

Azobisisobutyronitrile (AIBN, 98%), glycidyl methacrylate (>97%), potassium hydroxide, dimethylacetamide (DMAc), anisole (anhydrous, 99.7%), and poly(ethyleneglycol) methyl ether methacrylate (PEGMA, average Mn=475) are all purchased from Aldrich (USA). The PEGMA was passed through a column filled with alumina to remove the inhibitor before use. Cardanol was provided by Mercury Co., Ltd. (India).

1-1: HCPM

HCPM (2-hydroxy-3-cardanylpropyl methacrylate) was prepared as follows: Cardanol (10 g, 33 mmol), potassium hydroxide (1.9 g, 33 mmol), and dimethyl-acetamide (DMAc, 30 mL) were placed in a 250 mL round-bottom flask equipped with a magnetic stirring bar. After glycidyl methacrylate (9.4 g, 66 mmol) was added to the solution, the mixture was stirred for 3 days at 25° C. After the reaction, a few drops of concentrated HCl solution were dropped into the solution and DMAc was evaporated under high vacuum at elevated temperature. The crude product was dissolved in 0.5 N HCl solution and transferred to a separatory funnel. After extraction with methylene chloride (MC), the MC layer was dried over anhydrous magnesium sulfate and concentrated under vacuum condition. The obtained product was purified by silica gel column chromatography with ethyl acetate/n-hexane (1/6) as an eluent. An orange-colored viscous liquid was obtained with a yield of 49%. $^1$H NMR (300 MHz, CDCl$_3$, δ/ppm, TMS ref): 7.19 (t, 1H, aromatic), 6.67-6.83 (m, 3H, aromatic), 5.62 and 6.26 (s, 2H, —OC(O)C(CH$_3$))CH$_2$), 4.97-5.80 (m, —CH$_2$CH)CHCH$_2$—), 3.94-4.23 (m, 5H, —OCH$_2$CH(OH)CH$_2$OC(O)—), 2.75-2.90 (m, —CH$_2$CH)CHCH$_2$CH)CH—), 2.57 (t, 2H, —OC$_6$H$_4$CH$_2$—), 2.02 (m, —CH$_2$CH$_2$CH$_2$CH)CHCH$_2$—), 1.97 (s, 3H, —OC(O)C(CH$_3$))CH$_2$), 1.60 (m, 2H, CH$_3$(CH$_2$)$_{12}$CH$_2$CH$_2$—), 1.20-1.40 (m, CH$_3$(CH$_2$)$_{12}$CH$_2$—), 0.88 (t, 3H, —CH$_3$). Mass m/z calculated C$_{28}$H$_{44}$O$_4$$^+$: 444.32, found: 444.

1-2: Alkenyl Methacrylate

Methacrylate monomers substituted with an alkenyl group are prepared by esterification between a methacrylate monomer and an alkenyl alcohol as described in U.S. Pat. No. 4,371,689.

1-3: Methacrylate Derived from Unsaturated Fatty Acids

A methacrylate substituted with unsaturated fatty acids are prepared by esterification between an unsaturated fatty acid and a hydroxyl group-containing methacrylate such as 2-hydroxyethyl methacrylate (HEMA) as described in Malti and De (Malti, B. and De, P., *RSC Adv.*, 3:24983-24990, 2013) or by reacting an unsaturated fatty acid such as oleic acid and linoleic acid and glycidyl methacrylate using a catalyst such as AMC-2 catalyst as described in Scala et al. (Scala at al., *Polymer*, 45:7729-7737, 2004).

EXAMPLE 2

Preparation of Copolymer

Figure 1:
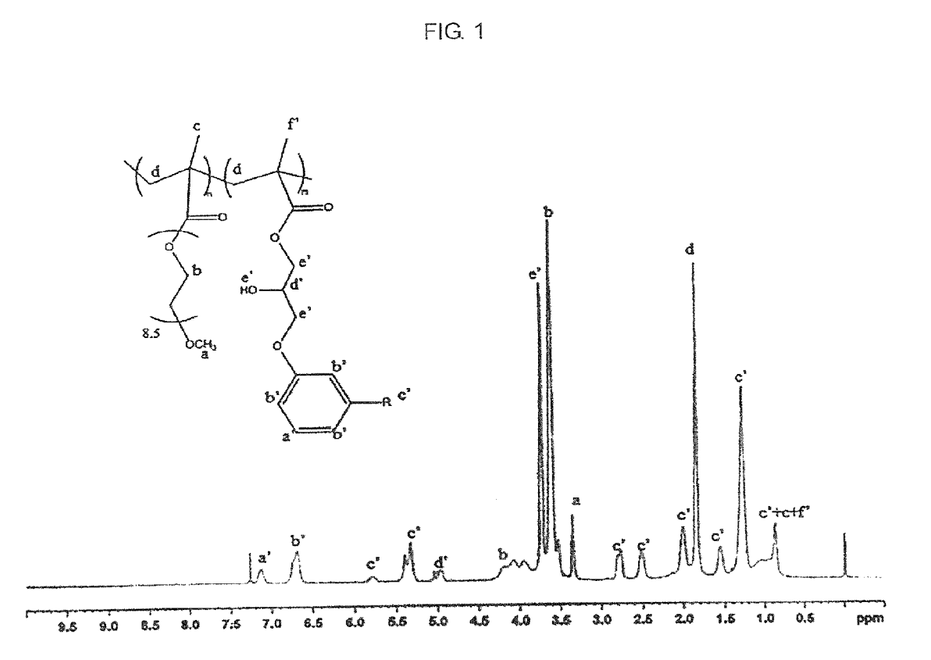
FIG. 1 is a 1H NMR spectrum of a polymer prepared according to an embodiment of the present disclosure.

Copolymers containing PEGMA and HCPM moieties were designated as PHP#, where # is the molar content of HCPM monomeric units in the polymers. The following procedure was used for the preparation of PHP containing 10 mol % HCPM and 90 mol % PEGMA monomeric units. AIBN (0.188 g, 1.14 mmol), PEGMA (4.85 g, 10.2 mmol), HCPM (0.5 g, 1.12 mmol), and anisole (11.0 mL) were placed into a 50 mL Schlenk flask equipped with a condenser and the reaction mixture was deoxygenated by three freeze-pump-thaw cycles and then stirred for 15 h in an oil bath thermostatted at 60° C. After terminating the reaction, the reaction mixture was chilled using liquid nitrogen and exposed to air in order to terminate further polymerization, and then monomers not participated in the reaction and by-products were removed by precipitating resulting waxy polymers in n-hexane. Finally after removing most of the solvent, the polymer solution was desiccated over 3 days under vacuum condition and stored dissolved in 10 wt % tetrahydrofuran (THF). The above reaction scheme will be summarized as:

The structure of resulting polymer was analyzed using $^1$H NMR spectrometry after dissolving the polymer to CDCl$_3$ solvent in order to verify that the resulting polymer was synthesized correctly (FIG. 1).

As shown in FIG. 1, it was confirmed that the resulting polymer had number average molecular weight (Mn) of 6,000 to 9,300 and mean molecular weight (Mw) of 12,500 to 20,000.

EXAMPLE 3

Synthesis of Polymer Whose Molar Ratio of Monomers was Varied

The present inventors prepared copolymers adjusting contents of HCPM and PEGMA in the method described in Example 2 and thus adjusting molar content of HCPM with 8, 17 and 36, respectively. The resulting polymers were designated as PHP8, PHP17 and PHP36, respectively. The resulting polymers prepared by the above procedure were all waxy.

The resulting polymers, PHP8, PHP17 and PHP36 had number average molecular weight (Mn) of 6,000 to 9,300 and mean molecular weight (Mw) of 12,500 to 20,000, too.

EXAMPLE 4

Preparation of Solid Phase Electrolytes

Thus, the present inventors prepared solid phase electrolytes by dispersing LiTFSI (lithium bis(trifluoromethanesulfonyl)imide) in the above-prepared polymers, PHP8, PHP17 and PHP36 and performing photo-crosslinking reaction using HMPP (2-hydroxy-2-methylpropiophenone) as a photo-crosslinker.

Particularly, 0.12 g of the polymer synthesized by the method described in Example 3, 28.5 mg of LiTFSI, and 0.89 mg of HMPP was dissolved in 0.5 ml of THF and the resulting solution was dropped on Teflon plate of 2 cm×2 cm size and irradiated with 365 nm of UV for 2 h.

On the other hand, the amount of LiTFSI was drawn by the pre-study. Particularly, molar ratio of Li$^+$ ion and ethylene oxide was adjusted at [Li]/[EO]=0.02, 0.05, 0.08, 0.11 or 0.14 and the ion conductivities of the polymers prepared using the above molar ratio was analyzed, wherein the [EO] is a molar equivalent of ethylene oxide. As a result, when LiTFSI with molar ratio of [Li]/[EO]=0.05 is added to the PHP8 polymer, the ionic conductivity is the highest. The resulting electrolytes were desiccated for two days under vacuum condition in order to remove solvent. And then the resulting solid phase film was detached from the Teflon plate using a razor blade. The resulting solid phase film was desiccated for two days under vacuum condition and removing the residual solvent completely thereby. As a result, all the resulting electrolytes prepared using PHP8, PHP17 and PHP36 were formed as solid phase film having good dimensional stability after irradiating UV light. On the contrary, PHP0 without cardanol-containing methacrylate did not photo-crosslinked and thus was sill waxy in spite of irradiating UV light, and did not have dimensional stability thereby. From the result, it is acknowledged that an alkenyl group-containing methacrylate monomers should be used in order to obtain solid phase film electrolytes.

Next, the present inventors measured the ion conductivities of the solid phase electrolytes prepared using PHP8, PHP17 and PHP36, respectively. As shown FIG. 2, it was confirmed that the lower molar ratio of cardanol-containing methacrylate monomers was, the higher the ionic conductivity was. Although the cardanol-containing methacrylate has a role in enhancing the mechanical strength of electrolytes through photo-crosslinking, its higher amount reduces contents of PEGMA as an ion transport pathway and flexibility of the electrolytes, and reduces the ionic conductivity thereby. However, if contents of the cardanol-containing methacrylate monomers is very low, it is difficult to obtain solid phase film, thus it is preferred that molar content of alkylene group-containing methacrylate monomers is at least 6%.

The present disclosure was described with reference to the above examples but this is merely exemplary, and one skilled in the art will understand and acknowledge that various modifications and equivalent other examples will be made. Therefore, the true technical scope of the disclosure should be determined by the technical features of the following claims.

What is claimed is:

1. A polymer having the following structure:

wherein, the n and m are integers of 1 or more, independently, x is an integer between 6 to 10, L is absent or a linker which is a bond or a divalent radical, and A is a moiety comprising an alkenyl group having 12 to 22 carbon atoms, wherein the alkenyl group has 1 to 6 double bonds.

2. The polymer according to claim 1,
wherein the bond is amide bond (—NHCO—), ester bond (—COO—) thioester bond (—COS—), ether bond (—O—), thioether bond (—S—), or disulfide bond (—S—S—).

3. The polymer according to claim 1,
wherein the divalent radical is an aliphatic radical having carbon numbers between 2 to 10, or an aromatic radical.

4. The polymer according to claim 1,
wherein the ratio of the n and m is 17:1 to 1:1.

5. The polymer according to claim 1,
wherein the A is cardanol, an alkenyl group or an unsaturated fatty acids.

6. The polymer according to claim 5,
wherein the cardanol has the following structure:

wherein the R is as follows:

R =

(40~45%)

(20~25%)

(30~35%)

(1~5%)

7. The polymer according to claim 5,
wherein the alkenyl group may be monounsaturated aliphatic hydrocarbon or polyunsaturated aliphatic hydrocarbon.

8. The polymer according to claim 5,
wherein the unsaturated fatty acid may be 5-dodecenoic acid (12:1(n-7)), 7-tetradecenonic acid (14:1(n-7)), palmitoleic acid (16:1(n-7)), vaccenic acid (18:1(n-7)), paullinic acid (20:1(n-7)), oleic acid (18:1(n-9)), elaidic acid (18:1(n-9)), eicosenoic acid (20:1(n-9)), erucic acid (22:1(n-9)), nervonic acid (24:1(n-9)), linoleic acid (18:2(n-6)), gamma-linolenic acid (18:3(n-6)), dihomo gamma-linolenic acid (18:3(n-6)), arachidonic acid (20:4(n-6)), alpha-linolenic acid (18:3(n-3)), eicosapentaenic acid, EPA (20:5(n-3)), or docosahexaenic acid, DHA (22:6(n-3)), or a combination of at least two fatty acid among above.

9. A solid phase electrolyte composition comprising a crosslinked polymer prepared by crosslinking the polymer of claim 1 with a photo-crosslinker; and an alkali metal salt dispersed in the polymer.

10. The solid phase electrolyte composition according to claim 9,
wherein the photo-crosslinker is 2-hydroxy-2-methylpropiophenone (HMPP), camphorquinone, acroyl chloride, trimethylopropane triacrylate (TPT), polyethylene glycol diacrylate (PEGDA), AIBN, BPO or 2,2-dimethoxy-2-phenylacetophenone (DMPA), or a combination of at least two photo-crosslinkers among the above photo-crosslinkers.

11. The solid phase electrolyte composition according to claim 9,
wherein the alkali metal salt is a lithium salt, sodium salt or potassium salt, or a combination thereof.

12. The solid phase electrolyte composition according to claim 11,
wherein the lithium salt is lithium bis(tetrafluoromethanesulfonyl)imide (LiTFSI), lithium hexafluorophosphate (LiPF$_6$), lithium perchlorate (LiClO$_4$), Lithium triflate (LiTf), lithium bis(oxaloto)borate (LiBOB), lithium tetrafluoroborate (LiBF$_4$), lithium oxalyldifluoroborate (LiODFB), or lithium fluoroalkylphosphate (LiFAP), or a combination thereof.

13. The solid phase electrolyte composition according to claim 11,
    wherein the sodium salt is sodium tetrafluoroborate (NaBF$_4$), sodium hexafluorophosphate (NaPF$_6$), sodium perchlorate (LiClO$_4$), 4,5-dicyano-2(trifluormethyl)imidazolate (NaTDI), or sodium 4,5-dicyano-2-(pentafluoroethyl)imidazolate (NaPDI), or a combination thereof.

14. The solid phase electrolyte composition according to claim 11,
    wherein the potassium salt is potassium tetrafluoroborate (KBF$_4$), potassium perchlorate (KClO$_4$), or potassium hexafluorophosphate (KPF$_6$), or a combination thereof.

15. A secondary battery comprising the solid phase electrolyte composition of claim 9.

\* \* \* \* \*